United States Patent
Cetin et al.

(10) Patent No.: US 11,024,174 B2
(45) Date of Patent: Jun. 1, 2021

(54) PARKING SPACE DETECTION APPARATUS

(71) Applicant: DENSO CORPORATION, Kariya (JP)

(72) Inventors: Hikmet Cetin, Kariya (JP); Shusaku Shigemura, Kariya (JP); Mitsuyasu Matsuura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/678,249

(22) Filed: Nov. 8, 2019

(65) Prior Publication Data

US 2020/0090517 A1    Mar. 19, 2020

Related U.S. Application Data

(63) Continuation of application No. PCT/JP2018/017802, filed on May 8, 2018.

(30) Foreign Application Priority Data

May 9, 2017  (JP) .............................. JP2017-092920

(51) Int. Cl.
  *B60R 1/00*         (2006.01)
  *G08G 1/14*         (2006.01)
  (Continued)

(52) U.S. Cl.
  CPC .............. *G08G 1/143* (2013.01); *B60R 1/00* (2013.01); *B62D 15/028* (2013.01);
  (Continued)

(58) Field of Classification Search
  CPC ... B60R 99/00; B60W 30/06; B60W 2420/42; B60W 2550/10; B60W 2554/00;
  (Continued)

(56) References Cited

U.S. PATENT DOCUMENTS

| 8,154,426 | B2 * | 4/2012 | Endo ...................... G08G 1/168 340/932.2 |
| 10,173,670 | B2 * | 1/2019 | Hayakawa ............. G08G 1/143 |
| 2013/0116859 | A1 * | 5/2013 | Ihlenburg ............... B60W 10/18 701/2 |

FOREIGN PATENT DOCUMENTS

| JP | 2013-220745 A | 10/2013 |
| JP | 2014-094726 A | 5/2014 |

(Continued)

*Primary Examiner* — Hai Phan
*Assistant Examiner* — Anthony D Afrifa-Kyei
(74) *Attorney, Agent, or Firm* — Maschoff Brennan

(57) ABSTRACT

A parking space detection apparatus detects a parking space of an own vehicle and includes: a vehicle determination section that determines whether an other vehicle is present on at least one of two sides of a parking space, based on search information acquired from an in-vehicle search section that searches for the parking space; a width calculation section that, it is determined that the other vehicle is present on at least one of the two sides of the parking space, calculate a width of the parking space on an entrance side and a width of the parking space on an inner side based on the search information; and a parking determination section that determines whether the own vehicle is able to park in the parking space based on the widths of the parking space on the entrance side and on the inner side and size of the own vehicle.

6 Claims, 4 Drawing Sheets

(51) Int. Cl.
*B62D 15/02* (2006.01)
*G01S 15/931* (2020.01)
*G06K 9/00* (2006.01)
*G08G 1/16* (2006.01)

(52) U.S. Cl.
CPC ........ *G01S 15/931* (2013.01); *G06K 9/00805* (2013.01); *G06K 9/00825* (2013.01); *G08G 1/165* (2013.01); *G08G 1/168* (2013.01); *B60R 2300/806* (2013.01); *G01S 2015/934* (2013.01); *G01S 2015/935* (2013.01)

(58) Field of Classification Search
CPC ......... B60W 2710/10; B60W 2710/18; B60W 2710/20; B62D 15/028; B62D 15/0285; G06T 7/60; G01S 15/931; G01S 2015/935; G06K 9/00805; G06K 9/00825; G06K 9/00812; G08G 1/165; G08G 1/168; G08G 1/14; G08G 1/143; G08G 1/146; G08G 1/147
See application file for complete search history.

(56) References Cited

FOREIGN PATENT DOCUMENTS

| | | |
|---|---|---|
| JP | 5786775 B2 | 9/2015 |
| JP | 2017-222309 A | 12/2017 |

\* cited by examiner

FIG.4
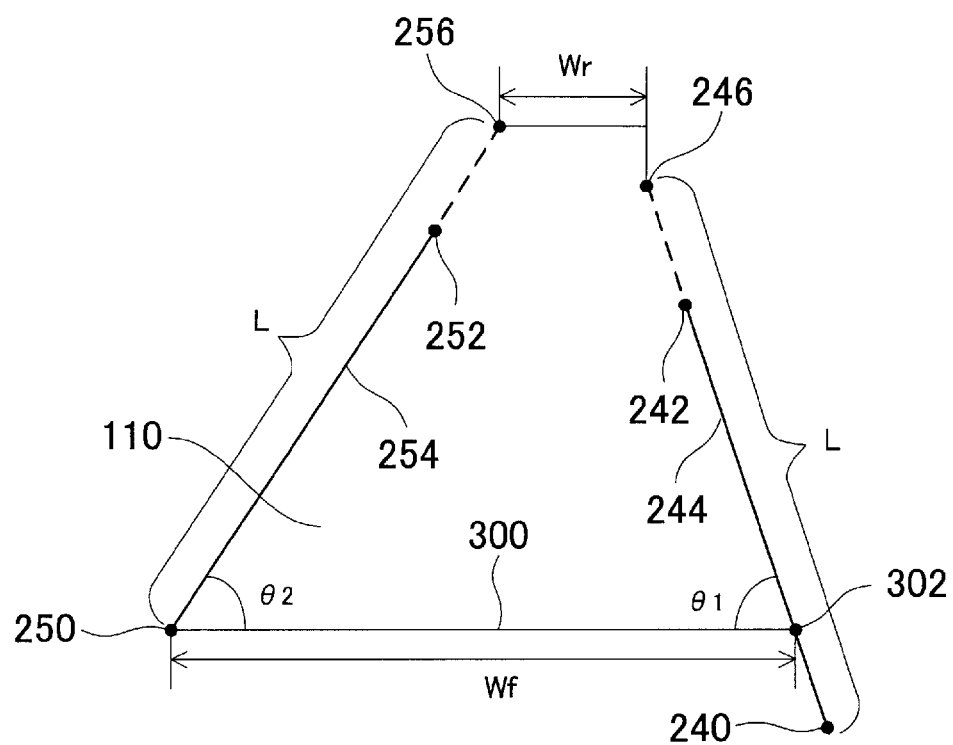
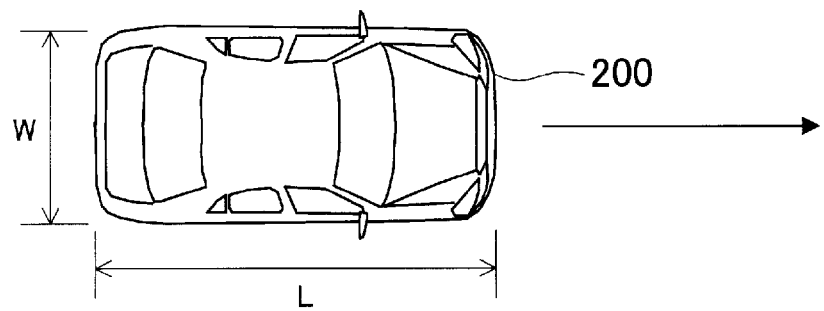

PARKING SPACE DETECTION APPARATUS

CROSS-REFERENCE TO RELATED APPLICATIONS

This application is based on and claims the benefit of priority from earlier Japanese Patent Application No. 2017-092920 filed May 9, 2017, the description of which is incorporated herein by reference.

BACKGROUND

Technical Field

The present disclosure relates to a technique to detect a parking space in which an own vehicle is parked.

Related Art

Techniques for detecting a parking space in which an own vehicle is able to park are known. In a technique, distances to other vehicles parked on both sides of a parking space are detected by using sensors such as ultrasonic sensors, laser radars, millimeter-wave radars, or the like, and outlines of the other vehicles on the entrance side of the parking space are specified from a distance data series.

SUMMARY

As an aspect of the present disclosure, a parking space detection apparatus is provided which detects a parking space of an own vehicle, the apparatus including: a vehicle determination section that is configured to determine whether an other vehicle is present on at least one of two sides of a parking space, based on search information acquired from an in-vehicle search section that searches for the parking space; a width calculation section that is configured to, when the vehicle determination section determines that the other vehicle is present on at least one of the two sides of the parking space, calculate a width of the parking space on an entrance side and a width of the parking space on an inner side based on the search information; and a parking determination section that is configured to determine whether the own vehicle is able to park in the parking space based on both the widths of the parking space on the entrance side and on the inner side calculated by the width calculation section and a size of the own vehicle.

The vehicle determination section is configured to acquire, as the search information, first search information according to probe waves transmitted from the search section and second search information according to image data obtained by the search section, and to, when determining that an object is present on at least one of the two sides of the parking space based on the first search information, determine whether the object is the other vehicle based on the second search information.

BRIEF DESCRIPTION OF THE DRAWINGS

In the accompanying drawings:

FIG. 4 is a schematic diagram showing a parking space.

DETAILED DESCRIPTION OF THE PREFERRED EMBODIMENTS

As a technique for detecting a parking space in which an own vehicle is able to park, a technique disclosed in Japanese Patent No. 5786775 is known. Japanese Patent No. 5786775 discloses a technique to detect distances to other vehicles parked on both sides of a parking space by using sensors such as ultrasonic sensors, laser radars, millimeter-wave radars, or the like, and specify outlines of the other vehicles on the entrance side of the parking space from a distance data series.

Japanese Patent No. 5786775 further discloses a technique in which, in the outlines of the other vehicles, which are parked on both sides of the parking space, on the entrance side of the parking space, the distance between edges of the vehicles opposed to each other with the parking space being interposed therebetween is defined as a width of the parking space. The width of the parking space and the size of the own vehicle are compared with each other to determine whether the own vehicle is able to park in the parking space.

The inventor found that, in the technique disclosed in Japanese Patent No. 5786775, although the distance between the other vehicles, which are parked on both sides of the parking space, on the entrance side is defined as a width of the parking space, the distance between the other vehicles on the inner side of the parking space is not considered.

As a result, for example, if at least one of the other vehicles parked on both sides of the parking space is parked obliquely, the width of the parking space on the inner side may be narrower than the width of the parking space on the entrance side. In this case, a problem was found that even if it is determined that the own vehicle is able to park in the parking space based on the distance between the other vehicles on the entrance side, the own vehicle cannot be parked in the parking space because the width of the parking space on the inner side is narrow.

The present disclosure provides a technique to detect a parking space in which an own vehicle is able to park with considering a width of the parking space on an inner side.

Hereinafter, an embodiment of the present disclosure will be described with reference to the drawings.

1. Configuration

Figure 1:
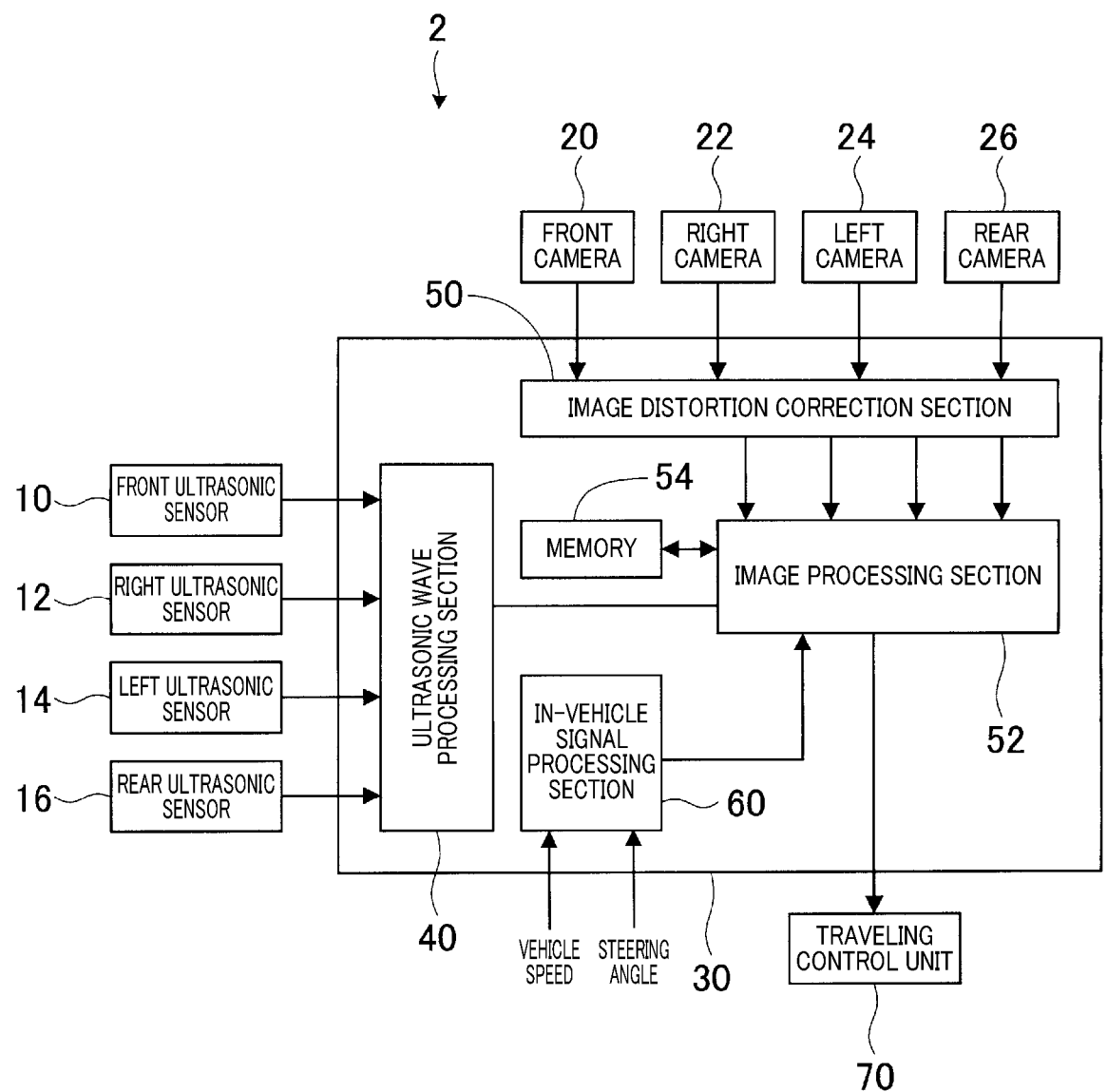
FIG. 1 is a block diagram of a parking space detection apparatus according to an embodiment.

A parking space detection system 2 shown in FIG. 1 includes a front ultrasonic sensor 10, a right ultrasonic sensor 12, a left ultrasonic sensor 14, a rear ultrasonic sensor 16, a front camera 20, a right camera 22, a left camera 24, a rear camera 26, and a parking space detection apparatus 30.

The front ultrasonic sensor 10, the right ultrasonic sensor 12, the left ultrasonic sensor 14, and the rear ultrasonic sensor 16 respectively transmits ultrasonic waves as probe waves in the front direction, right direction, left direction, and rear direction of an own vehicle, and receive reflected waves.

The front camera 20, the right camera 22, the left camera 24, and the rear camera 26 respectively captures images of areas in the front direction, right direction, left direction, and rear direction from an own vehicle and output image data. The cameras 20 to 26 capture images by using wide-angle lenses.

The parking space detection apparatus 30 includes an ultrasonic wave processing section 40, an image distortion correction section 50, an image processing section 52, a memory 54, and an in-vehicle signal processing section 60. The parking space detection apparatus 30 starts a process for detecting a parking space when, for example a driver turns on a parking assistance switch.

The parking space detection apparatus 30 is configured by a microcomputer including a CPU, a ROM, a RAM, and a flash memory. The ROM, the RAM, and the flash memory are semiconductor memories, which are non-transitory tangible recording mediums. The parking space detection apparatus 30 may include one or more microcomputers.

Various functions of the parking space detection apparatus 30 are performed by the CPU executing a program stored in the non-transitory tangible recording medium. The CPU executes the program to perform a method corresponding to the program.

The various functions of the parking space detection apparatus 30 may be performed not only by software but also by hardware in which some or all elements are configured by combining logic circuits, analog circuits, and the like.

The ultrasonic wave processing section 40 acquires, as search information, a transmission direction of the ultrasonic waves and a time period from transmission of the ultrasonic waves to reception of reflected waves. Then, based on the acquired search information, the ultrasonic wave processing section 40 determines whether an object is present in the transmission direction and detects a distance to the object when the object is present.

Figure 2:
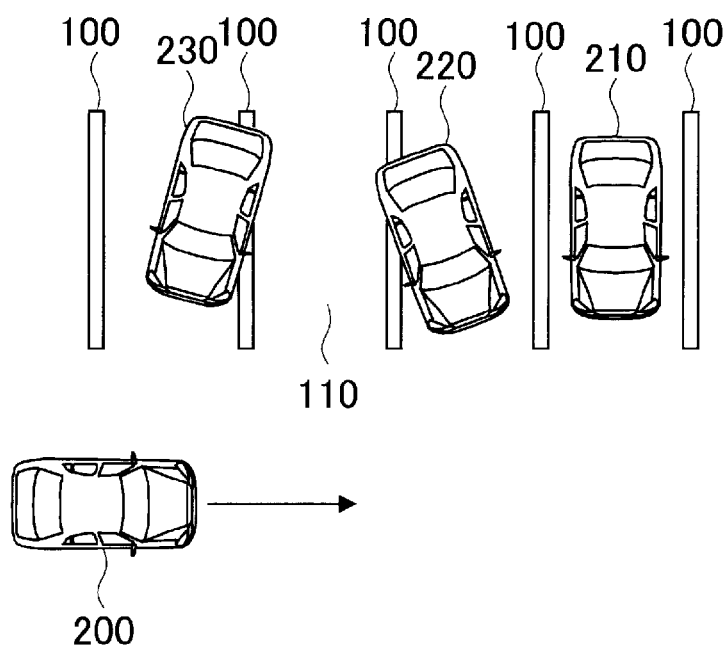
FIG. 2 is a diagram illustrating a state of parked other vehicles.

FIG. 2 exemplifies a state where three other vehicles 210, 220, and 230 are parked in parking spaces partitioned with white lines 100. When an own vehicle 200 is moving in a parking area, the ultrasonic wave processing section 40 detects, based on the above search information acquired mostly from the left and right ultrasonic sensors, directions of the other vehicles 210, 220, and 230 from the own vehicle 200 and distances to the other vehicles 210, 220, and 230.

The ultrasonic wave processing section 40 outputs the directions of the other vehicles 210, 220, and 230 and the distances to the other vehicles 210, 220, and 230, to the image processing section 52. From the directions of the other vehicles 210, 220, and 230 and the distances to the other vehicles 210, 220, and 230, relative positions of the other vehicles 210, 220, and 230 with respect to the own vehicle 200 can be calculated.

The image distortion correction section 50 corrects distortion of an image included in image data obtained and output from the front camera 20, the right camera 22, the left camera 24, and the rear camera 26, based on characteristics of wide-angle lenses of the cameras.

The image processing section 52 stores each frame of the image data corrected by the image distortion correction section 50 in the memory 54. The memory 54 is configured by, for example, a ring buffer. In the memory 54, the oldest frame is overwritten with the latest frame.

For example, in FIG. 2, the image processing section 52 calculates relative positions of the other vehicles 210, 220, and 230 with respect to the own vehicle 200, based on the directions of the other vehicles 210, 220, and 230 and the distances to the other vehicles 210, 220, and 230. The image processing section 52 calculates positions of the other vehicles 210, 220, and 230 in a plane coordinate system, based on the relative positions of the other vehicles 210, 220, and 230 with respect to the own vehicle 200 and the position of the own vehicle 200 in a plane coordinate system described later.

The relative positions of the other vehicles 210, 220, and 230 with respect to the own vehicle 200 may be calculated by the ultrasonic wave processing section 40. In addition, the positions of the other vehicles 210, 220, and 230 in the plane coordinate system may be calculated by the ultrasonic wave processing section 40.

The image processing section 52 detects, based on the positions of the other vehicles 210, 220, and 230, presence of a parking space 110 as a candidate of a parking space where the own vehicle 200 is able to park, between the other vehicle 220 and the other vehicle 230. Then, the image processing section 52 calculates a width Wf of the parking space 110 on the entrance side (at an entrance to the parking space 110) and a width Wr of the parking space 110 on the inner side (at a position longitudinally inside the parking space), and determines whether the own vehicle 200 is able to park in the parking space 110. The calculation of the width Wf on the entrance side and the width Wr on the inner side will be described later in detail.

The in-vehicle signal processing section 60 acquires a vehicle speed from a vehicle speed sensor and acquires a steering angle from a steering angle sensor. The in-vehicle signal processing section 60 calculates a movement direction and a movement amount of the own vehicle from the origin of the plane coordinate system, based on the acquired vehicle speed and steering angle. As the origin of the plane coordinate system, for example, a reference position is set such as the center position of a front wheel axle of the own vehicle when the parking assistance switch is turned on to start the process for detecting a parking space.

The in-vehicle signal processing section 60 calculates a position of the own vehicle in the plane coordinate system from the calculated movement direction and movement amount. The in-vehicle signal processing section 60 outputs the plane coordinate system and the calculated position of the own vehicle to the image processing section 52.

2. Process

Hereinafter, a parking space detection process performed by the parking space detection apparatus 30 will be described with reference to a flowchart in FIG. 3. The flowchart in FIG. 3 starts when, for example, a driver turns on the parking assistance switch.

Figure 3:
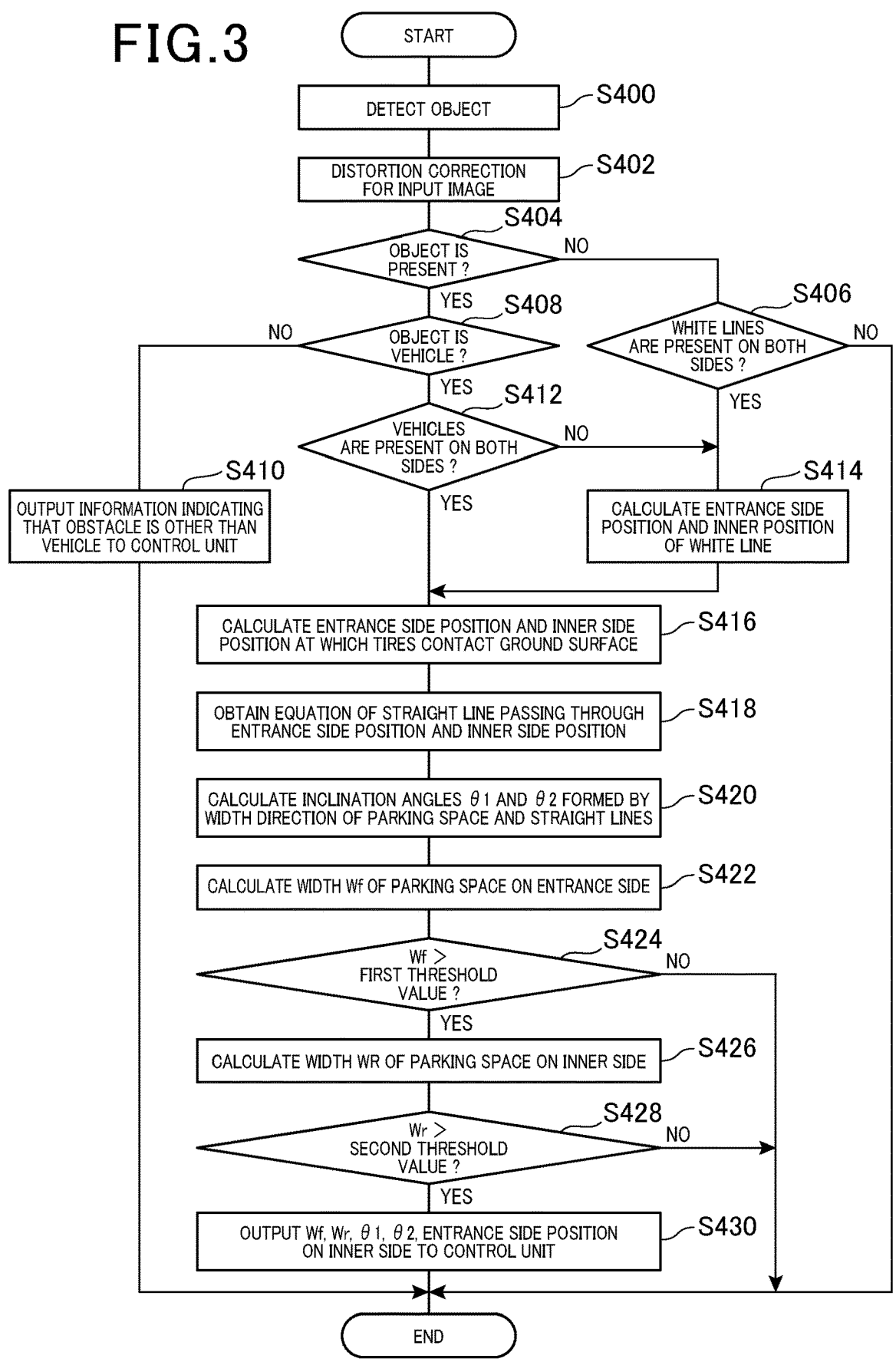
FIG. 3 is a flowchart of a parking space detection process.

In S400 in FIG. 3, the ultrasonic wave processing section 40 detects a direction of an object present around the own vehicle with respect to the own vehicle and a distance between the object and the own vehicle. In S402, the image distortion correction section 50 corrects distortion of the image data obtained by the front camera 20, the right camera 22, the left camera 24, and the rear camera 26, based on the characteristics of the wide-angle lenses.

In S404, the image processing section 52 determines whether an object is present on at least one of two sides of a parking space, based on a detection result of the ultrasonic wave processing section 40 in S400. If a No determination is made in S404, that is, if no object is present on either of the two sides of the parking space, in S406, the image processing section 52 determines whether white lines are present on both the two sides of the parking space.

If a No determination is made in S406, that is, if no object is present on either side of the parking space, and no white lines are also present, the present process ends. If a Yes determination is made in S406, that is, if no object is present on either side of the parking space, but white lines are present, the present process proceeds to S414, which will be described later.

If a Yes determination is made in S404, that is, if an object is present on at least one of the two sides of the parking space, in S408, the image processing section 52 determines whether the object present on at least one of the two sides of the parking space is a vehicle by processing such as pattern matching, based on the image data acquired from the image distortion correction section 50.

If a No determination is made in S408, that is, if the object present on at least one of the two sides of the parking space is not a vehicle, in S410, the image processing section 52 outputs information indicating that the object present on at least one of the two sides of the parking space is not a vehicle to a traveling control unit 70.

If a Yes determination is made in S408, that is, if the object present on at least one of the two sides of the parking space is a vehicle, in S412, the image processing section 52 determines whether vehicles are present on both the two sides of the parking space.

If a No determination is made in S412, that is, if a vehicle is present on one of the two sides of the parking space, and no vehicle is present on the other of the two sides, the present process proceeds to S414. If a Yes determination is made in S412, that is, if vehicles are present on both the two sides of the parking space, the present process proceeds to S416.

In S414, in both cases where a vehicle is present on one of the two sides of the parking space and a white line is present on the other of the two sides, and where no vehicle is present on either of the two sides of the parking space and the parking space is defined by white lines, the image processing section 52 calculates, in the plane coordinate system, an entrance side position that is a start position of the white line and an inner position that is an end position of the white line when viewed from the own vehicle (toward inner side positions). After S414, the present process proceeds to S416.

In S416, in a case where a vehicle is present on at least one of the two sides of the parking space, the image processing section 52 calculates, in the plane coordinate system, an entrance side position at which a tire on the entrance side of the vehicle contacts the ground surface and an inner side position at which a tire on the inner side of the vehicle contacts the ground surface.

In S418, as shown in FIG. 4, the image processing section 52 obtains an equation of a straight line 244 passing through an entrance side position 240 and an inner side position 242 on the right side of the parking space 110 and an equation of a straight line 254 passing through an entrance side position 250 and an inner side position 252 on the left side of the parking space 110.

In S420, the image processing section 52 performs an image analysis to calculate, as inclination angles formed by the straight lines 244 and 254 and the width direction of the parking space 110, for example, inclination angles θ1 and θ2 respectively formed by the straight lines 244 and 254 and a straight line 300 extending in the width direction of the parking space 110 toward the straight line 244 with passing through the entrance side position 250 on the inner side of the parking space 110.

In S422, the image processing section 52 calculates, as a width Wf on the inner side, the width of the parking space 110 at the entrance side position 250 based on coordinates of the entrance side position 250 and coordinates of an intersection point 302 of the straight line 300 and the straight line 244.

In S424, the image processing section 52 determines whether the width Wf on the entrance side is more than a first predetermined threshold value. As the first predetermined threshold value, for example, a value is set which is obtained by multiplying a vehicle width W of the own vehicle 200 by a margin K1 when the own vehicle 200 enters the entrance of the parking space 110. K1 is a value larger than 1 and smaller than 2.

If a No determination is made in S424, that is, if the width Wf on the entrance side is the first predetermined threshold value or less, the image processing section 52 determines that it is difficult for the own vehicle 200 to park in the parking space 110, and then the present process ends.

If a Yes determination is made in S424, that is, if the width Wf on the entrance side is more than the first predetermined threshold value, in S426, the image processing section 52 calculates the width Wr of the parking space 110 on the inner side as below.

The image processing section 52 calculates, as the width Wr on the inner side, the width of the parking space 110 when end positions 246 and 256 are viewed from the entrance side of the parking space 110 (toward inner side positions). The end positions 246 and 256 are on lines extending from respective entrance side positions 240 and 250 of the parking space 110 toward the inner side positions 242 and 252 along the straight lines 244 and 254 by the total length L of the own vehicle 200.

It is noted that, in FIG. 4, for reasons of layout of the figure, the total length L indicated for the own vehicle 200 and the total length L indicated for the parking space 110 are different from each other.

In S428, the image processing section 52 determines whether the width Wr on the inner side is more than a second predetermined threshold value. As the second predetermined threshold value, for example, a value is set which is obtained by multiplying a vehicle width W of the own vehicle 200 by a margin K2 when the own vehicle 200 enters the inner side of the parking space 110. K1 and K2 may be the same or may be different from each other according to the shape of the own vehicle 200.

If a No determination is made in S428, that is, if the width Wr on the inner side is the second predetermined threshold value or less, the image processing section 52 determines that it is difficult for the own vehicle 200 to park in the parking space 110, and then the present process ends.

If a Yes determination is made in S428, that is, if the width Wr on the inner side is more than the second predetermined threshold value, the image processing section 52 determines that the own vehicle 200 is able to park in the parking space 110. In this case, in step S430, the image processing section 52 outputs the inclination angles θ1 and θ2, the width Wf on the entrance side, the width Wr on the inner side, and, for example, coordinates of the entrance side position 250 of the parking space 110 on the inner side as a position of at least any of apexes of a rectangle formed by the width Wf on the entrance side, the width Wr on the inner side, and the inclination angles θ1 and θ2, to the traveling control unit 70 that controls steering, braking, and vehicle speed of the own vehicle 200.

The traveling control unit 70 controls travel of the own vehicle 200 to be parked in the parking space 110, based on the inclination angles θ1 and θ2, the width Wf on the entrance side, the width Wr on the inner side, and coordinates of the position of at least any of apexes of the rectangle formed by the width Wf on the entrance side, the width Wr on the inner side, and the inclination angles θ1 and θ2.

It is noted that the parking space detection apparatus 30 performs a parking space detection process shown by a flowchart in FIG. 3 for each frame of image data obtained by the cameras 20 to 26 until a parking space in which the own vehicle is able to park is detected. If a parking space in which the own vehicle is able to park is not detected though the parking space detection process has been performed for all candidates for parking spaces, the parking space detection apparatus 30 notifies a driver of the absence of parking spaces by sounds, image display, or the like.

3. Effects

According to the above embodiment, the following effects can be obtained.

(a) As shown in FIG. 2, even when the width of the parking space 110 on the inner side is narrower than the width of the parking space on the entrance side because the other vehicles 220 and 230 are parked obliquely on both the two sides of the parking space 110, whether the own vehicle 200 is able to park in the parking space 110 can be determined with high accuracy.

(b) When the own vehicle starts parking into a parking space because the width of the parking space on the entrance side is larger than the width of the own vehicle, the own vehicle can be prevented from stopping parking due to the width of the parking space on the inner side being equal to or smaller than the width of the own vehicle. Hence, since the own vehicle can be prevented from stopping parking while entering the parking space and from detecting another parking space, time for detecting another parking space can be shortened.

(c) If the own vehicle 200 is able to park in the parking space 110, the traveling control unit 70, which controls steering, braking, and vehicle speed of the own vehicle 200, acquires the inclination angles θ1 and θ2, the width Wf on the entrance side, and the width Wr on the inner side regarding the parking space 110 from the parking space detection apparatus 30. The traveling control unit 70 can park the own vehicle 200 in the parking space 110 based on the acquired inclination angles θ1 and θ2, the width Wf on the entrance side, and the width Wr on the inner side.

In the embodiment described above, the front ultrasonic sensor 10, the right ultrasonic sensor 12, the left ultrasonic sensor 14, the rear ultrasonic sensor 16, the front camera 20, the right camera 22, the left camera 24, and the rear camera 26 correspond to a search section. The ultrasonic wave processing section 40 corresponds to a vehicle determination section, and the image processing section 52 corresponds to the vehicle determination section, a width calculation section, a parking determination section, and a notification section.

In addition, the transmission direction of ultrasonic waves acquired by the parking space detection apparatus 30 from the front ultrasonic sensor 10, the right ultrasonic sensor 12, the left ultrasonic sensor 14, and the rear ultrasonic sensor 16, and the time period from transmission of the ultrasonic waves to reception of reflected waves correspond to first search information, and the image data acquired by the parking space detection apparatus 30 from the front camera 20, the right camera 22, the left camera 24, and the rear camera 26 corresponds to second search information.

In addition, in the above embodiment, S400 to S404, S408, and S412 correspond to processing by the vehicle determination section, S414 to S422 and S426 correspond to processing by the width calculation section, S424 and S428 correspond to processing by the parking determination section, and S430 corresponds to processing by the notification section.

4. Other Embodiments (1) In the above embodiment, an example is described in which the parking space 110 whose width Wr on the inner side is less than the width Wf on the entrance side. Alternatively, a parking space whose width Wf on the entrance side is less than the width Wr on the inner side and in which the own vehicle 200 is able to park also can be detected according to the flowchart in FIG. 3.

(2) In the above embodiment, ultrasonic sensors transmitting ultrasonic waves as probe waves are used as the search section. Alternatively, millimeter-wave radars transmitting millimeter waves as probe waves or LIDARs transmitting laser beams as probe waves may be used as the search section.

(3) In the above embodiment, an example is described in which a parking space is detected in a case where side-by-side parking where the total length direction of the own vehicle is the depth direction is carried out. Alternatively, even in a case where parallel parking where the vehicle width direction of the own vehicle is the depth direction is carried out, it may be determined whether the own vehicle is able to park in the parking space based on whether both the widths of the parking space on the entrance side and the inner side are more than the total length of the own vehicle.

(4) In the above embodiment, the position of the own vehicle in the plane coordinate system is calculated based on a vehicle speed and a steering angle of the own vehicle. Alternatively, when accuracy of an absolute position of the own vehicle measured based on a positioning signal received from positioning satellites is high, the absolute position may be used as a position of the own vehicle in the plane coordinate system.

(5) In the above embodiment, a plurality of functions of a single component may be implemented by a plurality of components, or a single function of a single component may be implemented by a plurality of components. Furthermore, a plurality of functions of a plurality of components may be implemented by a single component, or a single function implemented by a plurality of components may be implemented by a single component. Furthermore, part of the configuration of the embodiment may be omitted. Furthermore, at least part of the configuration of the embodiment may be added to or substituted by another part of the configuration of the embodiment. Any aspect included in the technical idea specified only by the wording of the claims is an embodiment of the present disclosure.

(6) In addition to the parking space detection apparatus 30 described above, the present disclosure may be implemented by various aspects such as parking space detection system 2 including the parking space detection apparatus 30 as a component, a parking space detection program allowing a computer to function as the parking space detection apparatus 30, a recording medium storing the parking space detection program, and a parking space detection method.

As an aspect of the present disclosure, a parking space detection apparatus is provided which detects a parking space of an own vehicle and includes a vehicle determination section, a width calculation section, and a parking determination section.

The vehicle determination section (40, 52, S400 to S404, S408, S412) is configured to determine whether an other vehicle (220, 230) is present on at least one of two sides of a parking space, based on search information acquired from an in-vehicle search section (10 to 16, 20 to 26) that searches for the parking space;

The width calculation section (52, S414 to S422, S426) is configured to, when the vehicle determination section determines that the other vehicle is present on at least one of the two sides of the parking space, calculate a width (Wf) of the parking space on an entrance side and a width (Wr) of the parking space on an inner side based on the search information The parking determination section (52, S424, S428) is configured to determine whether the own vehicle is able to park in the parking space based on both the widths of the parking space on the entrance side and on the inner side calculated by the width calculation section and a size of the own vehicle.

According to the above configuration, for example, even when the width of the parking space on the inner side is narrower than the width of the parking space on the entrance side because the other vehicle is parked obliquely, whereby the width of the parking space on the entrance side differs from that on the inner side, whether the own vehicle 200 is able to park in the parking space can be determined with high accuracy.

What is claimed is:

1. A parking space detection apparatus that detects a parking space of an own vehicle, the parking space detection apparatus comprising:
   a vehicle determination section that is configured to determine whether an other vehicle is present on at least one of two sides of a parking space, based on search information acquired from an in-vehicle search section that searches for the parking space;
   a width calculation section that is configured to, when the vehicle determination section determines that the other vehicle is present on at least one of the two sides of the parking space, calculate a width of the parking space on an entrance side and a width of the parking space on an inner side based on the search information; and
   a parking determination section that is configured to determine whether the own vehicle is able to park in the parking space based on both the widths of the parking space on the entrance side and on the inner side calculated by the width calculation section and a size of the own vehicle, wherein
   the vehicle determination section is configured to acquire, as the search information, first search information according to probe waves transmitted from the in-vehicle search section and second search information according to image data obtained by the in-vehicle search section, and to, when determining that an object is present on at least one of the two sides of the parking space based on the first search information, determine whether the object is the other vehicle based on the second search information,
   when other vehicles are present on the two sides of the parking spaces in a case where side-by-side parking is carried out, the width calculation section
      calculates, as a width on the entrance side, a width of the parking space at an entrance side position of the parking space on the inner side at which a tire on the entrance side of at least one of the other vehicles next to the parking space contacts a ground surface, and
      calculates, as a width on the inner side, a width of the parking space when two end positions are viewed from the entrance side of the parking space, the two end positions being on lines extending, by a total length of the own vehicle, from respective entrance side positions of the other vehicles toward inner side positions, at which a tire on the inner side contacts the ground surface, and
   when the other vehicle is present on one of the two sides of the parking space and no other vehicle is present on the other of the two sides of the parking space in a case where side-by-side parking is carried out, the width calculation section
      calculates, as a width on the entrance side, a width of the parking space at the entrance side position of the parking space on the inner side, which is one of the entrance side position of the one other vehicle next to the parking space and an entrance side position of a white line on the other side of the parking space on which no vehicle is present, and
      calculates, as a width on the inner side, a width of the parking space when two end positions are viewed from the entrance side of the parking space, the end positions being on lines respectively extending from the entrance side position of the one other vehicle and the entrance side position of the white line toward an inner side position of the own vehicle and an inner side position of the white line.

2. A parking space detection apparatus that detects a parking space of an own vehicle, the parking space detection apparatus comprising:
   a vehicle determination section that is configured to determine whether an other vehicle is present on at least one of two sides of a parking space, based on search information acquired from an in-vehicle search section that searches for the parking space;
   a width calculation section that is configured to, when the vehicle determination section determines that the other vehicle is present on at least one of the two sides of the parking space, calculate a width of the parking space on an entrance side and a width of the parking space on an inner side based on the search information; and
   a parking determination section that is configured to determine whether the own vehicle is able to park in the parking space based on both the widths of the parking space on the entrance side and on the inner side calculated by the width calculation section and a size of the own vehicle, wherein
   when other vehicles are present on the two sides of the parking space in a case where side-by-side parking is carried out, the width calculation section
      calculates, as a width on the entrance side, a width of the parking space at an entrance side position of the parking space on the inner side at which a tire on the entrance side of at least one of the other vehicles next to the parking space contacts a ground surface, and
      calculates, as a width on the inner side, a width of the parking space when two end positions are viewed from the entrance side of the parking space, the two end positions being on lines extending, by a total length of the own vehicle, from respective entrance side positions of the other vehicles toward inner side positions, at which a tire on the inner side contacts the ground surface, and
   when one other vehicle is present on one of the two sides of the parking space and no other vehicle is present on the other of the two sides of the parking space in a case where side-by-side parking is carried out, the width calculation section calculates, as a width on the entrance side, a width of the parking space at the entrance side position of the parking space on the inner side, which is one of the entrance side position of the one other vehicle next to the parking space and an entrance side position of a white line on the other side of the parking space on which no vehicle is present, and calculates, as a width on the inner side, a width of the parking space when two end positions are viewed from the entrance side of the parking space, the end positions being on lines respectively extending from the entrance side position of the one other vehicle and the entrance side position of the white line toward an inner side position of the own vehicle and an inner side position of the white line.

3. The parking space detection apparatus according to claim 1, further comprising a notification section that is configured to, when the parking determination section determines that the own vehicle is able to park in the parking space based on the width of the parking space on the entrance side and the width of the parking space on the inner side, output the width on the entrance side, the width on the inner side, inclination angles respectively formed by the lines on the two sides of the parking space and a width direction of the parking space, and a position of at least one of apexes of a rectangle formed by the width on the entrance side, the width on the inner side, and the inclination angles, to a traveling control unit that controls travel of the own vehicle to be parked in the parking space.

4. The parking space detection apparatus according to claim 3, wherein when the vehicle determination section determines that the object present on at least one of the two sides of the parking space is not a vehicle, the parking determination section does not determine whether the own vehicle is able to park in the parking space, and the notification section outputs information indicating that the object present on at least one of the two sides of the parking space is not a vehicle, to the traveling control unit.

5. The parking space detection apparatus according to claim 2, further comprising a notification section that is configured to, when the parking determination section determines that the own vehicle is able to park in the parking space based on the width of the parking space on the entrance side and the width of the parking space on the inner side, output the width on the entrance side, the width on the inner side, inclination angles respectively formed by the lines on the two sides of the parking space and a width direction of the parking space, and a position of at least one of apexes of a rectangle formed by the width on the entrance side, the width on the inner side, and the inclination angles, to a traveling control unit that controls travel of the own vehicle to be parked in the parking space.

6. The parking space detection apparatus according to claim 5, wherein when the vehicle determination section determines that the object present on at least one of the two sides of the parking space is not a vehicle, the parking determination section does not determine whether the own vehicle is able to be park in the parking space, and the notification section outputs information indicating that the object present on at least one of the two sides of the parking space is not a vehicle, to the traveling control unit.

* * * * *